Oct. 8, 1940.  B. M. BODDE  2,216,901
PROJECTION SCREEN
Original Filed May 17, 1938  2 Sheets-Sheet 1
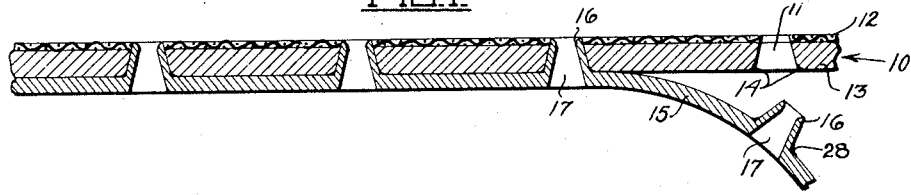
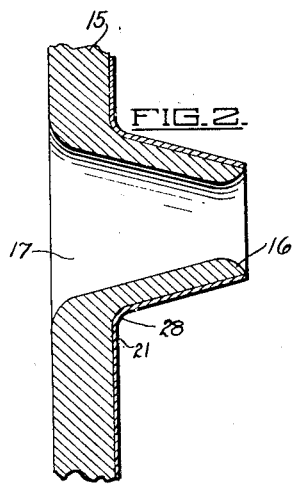
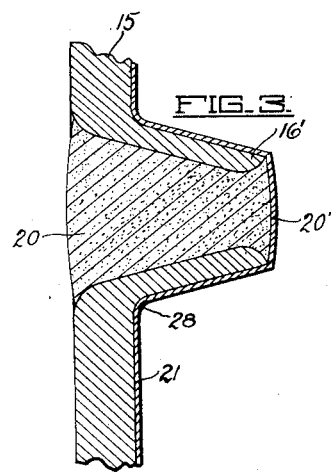
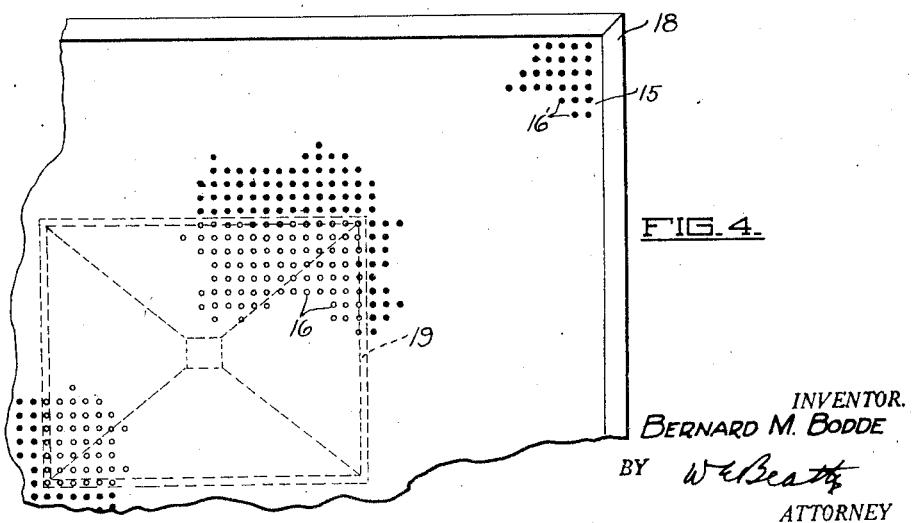
INVENTOR.
BERNARD M. BODDE
BY W. E. Beatty
ATTORNEY Oct. 8, 1940. B. M. BODDE 2,216,901
PROJECTION SCREEN
Original Filed May 17, 1938 2 Sheets-Sheet 2
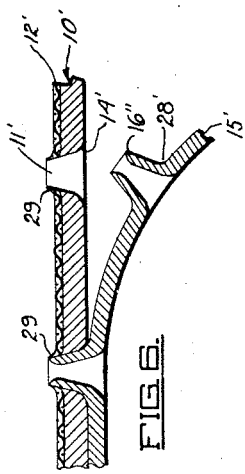
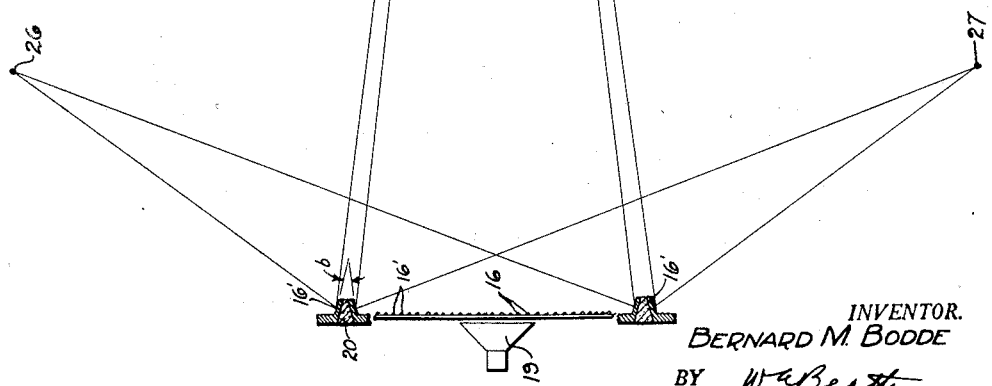
INVENTOR.
BERNARD M. BODDE
BY
ATTORNEY Patented Oct. 8, 1940

2,216,901

UNITED STATES PATENT OFFICE 2,216,901

PROJECTION SCREEN

Bernard M. Bodde, Hollywood, Calif., assignor to Flat Light Screen Co., Los Angeles, Calif., a corporation of California Application May 17, 1938, Serial No. 208,433
Renewed March 4, 1940

2 Claims. (Cl. 88—24)

This invention relates to a picture projection screen and has particular reference to projection screens of the reflective type.

One object of the present invention is to render a projected picture clearer and more brilliant particularly when viewed from a position which is not directly in front of the screen.

A further object is to facilitate manufacture of a picture projection screen.

A still further object is to increase the reflective qualities of a sound transmitting type of picture projection screen.

In my co-pending application S. N. 190,250 filed February 12, 1938, I have disclosed and claimed a projection screen obtained by spraying a mixture of screen material on a flat matrix having an array of small holes therein. The screen material after it is sufficiently dried is stripped from the matrix and is found to form a sheet wherein holes corresponding to the holes in the matrix are formed. Due to the surface tension of the screen material, the material is found to flow along the walls of the various holes in the matrix without filling the same so as to form tubular projections on the screen surface. This type of screen avoids the necessity of having seams therein such as are required with the usual type of perforated fabric screen and, furthermore, due to the fact that it is not necessary to perforate each screen, the cost of manufacture is materially reduced. It has been found, however, that the formation of cylindrical projections on the side of the screen produces slight shadows of such projections, especially at the edges of the screen, due to the diverging light beams from the picture projector. Furthermore it has been found that such cylindrical projections render the screen somewhat difficult to remove from the matrix.

The present invention forms an improvement over that illustrated in my co-pending application in that the tubular projections are frusto-conical in shape to prevent the formation of shadows and to permit the light rays from the projector to be received on the entire outer surface of such projections. This invention also permits the reduction of hot spot effect by increasing the reflective qualities of the screen at the edges thereof by filling the tubular projections which are not needed for the transmission of sound waves from an adjacent loud speaker.

The manner in which the above and other objects of the invention are accomplished will be readily understood on reference to the following specification when taken in conjunction with the accompanying drawings wherein:

Fig. 1 is a cross section of a matrix and screen body portion which has been sprayed thereon and about to be stripped therefrom.

Fig. 2 is an enlarged fragmentary sectional view of the screen body with an open tubular projection integrally formed thereon.

Fig. 3 is an enlarged fragmentary sectional view of the screen body similar to that of Fig. 2, but with the tubular projection shown therein filled.

Fig. 4 is a front view, partly broken away, of a sound transmitting picture projection screen made according to the present invention.

Fig. 5 is a schematic plan view, representative of actual theatre conditions, and embodying a screen made in accordance with the present invention.

Fig. 6 is a cross section, similar to that of Fig. 1, of a preferred form of matrix and a screen body portion sprayed thereon.

Referring in detail to Fig. 1, a matrix 10 is provided having an array of small tapered apertures 11 spaced throughout the area thereof. Matrix 10 comprises a sheet of fabric 12 forming a base or backing on which is applied a body of material 13 of amber or the like, non-compatible with the screen material to be formed thereon. The under surface of the body 13 is rendered smooth to receive the screen material sprayed thereon. The various apertures 11 are tapered and converge from the under surface of the matrix to the upper surface thereof. These holes may be formed in any suitable manner but are preferably punched with conical punches to reduce the cost of forming the same as well as to form a rounded edge 14 at the larger openings thereof. Preferably these holes are spaced from $\frac{1}{4}$ to $\frac{3}{8}$ of an inch apart and are from $\frac{1}{16}$ to $\frac{3}{32}$ of an inch in diameter at their smaller ends, tapering approximately 25° (included angle) toward their larger openings at the under surface of the matrix.

Preferably, during punching, the matrix is supported with its fabric surface upon a board of "Masonite" or board having a yielding body formation to allow the punch, when punched through the matrix 10' and its fabric 12' and into the Masonite board, to draw the edge of each punched hole 11'. (Fig. 6) into such board slightly, thus leaving a small lip 29 projecting beyond the surface of the matrix. This drawing action also increases the radius of the rounded edge 14' permitting a larger fillet 28' to be formed on the screen 15' at the base of each projection 16''.

The screen material to be sprayed upon the under surface of the matrix 10 is preferably formed of a cellulose ester solution dissolved in a solvent such as acetone and having incorporated therein a plasticizer. Various cellulose esters may be employed for the screen body. Some of the well known types of cellulose ester materials are cellulose acetate, cellulose nitrate, ethyl cellulose and benzyl cellulose.

The cellulose ester material, solvent and plasticizer are mixed together to form a solution suitable for spraying with the usual type of spraying equipment such as is used to apply paint, or the like. Multiple coats of the cellulose ester solution are sprayed on the under or smooth side of the matrix 10 to build up a screen body portion 15 having a desired thickness. As the screen material is sprayed on the matrix some of it enters the apertures 11 and adheres to the walls thereof, thus forming frusto-conical projections 16 extending the length of the apertures 11. Due to the surface tension of the sprayed material it does not, under ordinary circumstances, fill the various apertures 11 and therefore forms bores 17 in the projections 16. After the screen body portion 15 has dried sufficiently, it is stripped from the matrix 10 and is then suitably supported in a rectangular frame 18 (Fig. 4).

The projections thus produced are small enough to be rendered invisible to an audience at normal distances from the screen while the bores 17 are sufficiently large and closely spaced to efficiently transmit sound from one side of the screen to the other.

If the screen 15 is to be used to transmit sound from a loud speaker, as shown by the dotted lines 19 (Fig. 4) situated adjacent the rear surface thereof, the various tubular projections 16' outside the area directly opposite the mouth of the horn 19 are plugged with a filling mixture 20 (Fig. 3). This filling mixture may be of any suitable material having the consistency of putty but is preferably formed of titanium oxide mixed with a cellulose ester solution of the same type as that employed in the screen material dissolved in a slow solvent. For example, in the event that the screen 15 may be formed of cellulose acetate material, the filler 20 may comprise a mixture of five parts of titanium oxide, one part cellulose acetate, one part slow solvent and a sufficient amount of plasticizer to render the material of a consistency of soft putty permitting the same to be applied to the various hollow projections 16'. By employing a filling mixture containing the same type of cellulose ester solution as is used in the screen body a secure bond between the filler 20 and the inner walls of the tubular projections 16' is formed. The use of a slow solvent reduces the tendency of the solvent to dissolve the body 15 of the screen except a very thin layer next to the filling 20.

The filler material is applied to the bores 17 of projections 16' on the side of the screen opposite the projection 16 with a trowel or similar tool. After the filler material 20 has been applied to the screen, the portion thereof which may ooze or project beyond the smaller openings of the tubular projections 16' is removed in a suitable manner to form a flat or slightly convex front surface 20' as shown in Fig. 3.

Since the loudspeaker 19 is generally situated with the mouth thereof only a few inches from the rear surface of the screen, those hollow projections 16 within an area directly opposite the mouth of the loudspeaker 19 are generally sufficient to transmit sound therethrough. However, if the loudspeaker 19 is placed a distance of several feet or more from the screen, the unplugged area may be made larger than the area of the mouth of the loudspeaker. Furthermore, certain of the projections 16 throughout the area of the screen may be left unfilled to vary resonance, sound and light transmission, sound baffle effect of the screen and other characteristics.

The screen, after being plugged, is then sprayed with a light reflecting material comprising a mixture of titanium oxide and a cellulose ester material preferably of the same type as that employed in the screen body itself so as to effect a secure bond therebetween. Titanium is preferably employed because of its excellent reflective properties as well as fluorescence characteristics. The light reflecting material is sprayed on the side of the screen 15 having the projections 16 and 16' extending therefrom to form a thin coating 21. On those projections 16' which have been plugged with the filler material 20, the coating 21 of titanium oxide forms on the entire surface of such projections while on those unfilled projections 16 as shown in Fig. 2 the coating 21 adheres merely to the outer conical sides thereof without filling the ends, thus permitting the bores 17 to remain open throughout the length of the projections 16 and thereby forming an open sound passage through the screen 15.

The screen thus formed permits sound to be passed through the central portion thereof containing the unplugged tubular projections 16 while increasing the light reflection at the outer edges thereof by reason of the fact that the various tubular projections 16' exteriorly of the portion opposite the loud speaker 19 are plugged and rendered light reflective across the entire area thereof.

Due to the fact that practically all picture projector light beams have a hot-spot or central cross sectional portion of greater brilliancy than the exterior portions thereof, the screen according to the present invention permits the light intensity of a projected picture reflected therefrom to be better balanced as to reflected light intensity throughout the entire area thereof.

As an alternative form of manufacturing the screen according to the present invention, an opaque reflecting material, preferably of titanium oxide, may be incorporated within the cellulose ester material forming the screen body itself. That is, titanium oxide may be mixed with a liquid cellulose mixture which is to be sprayed onto the surface of matrix 10 for forming the screen body. In this event, the filler material 20 applied to the various tubular projections 16' exteriorly of the portion of the screen directly opposite the mouth of the loud speaker 19 is also formed of titanium oxide to exhibit substantially the same reflecting characteristics as the main body of the screen itself.

In the event that the screen 15 is not to transmit sound therethrough, the projections throughout the entire area thereof may be suitably plugged with filler material 20.

As was described hereinbefore, an important feature of the present invention is to improve the reflective qualities of the screen when the viewing angle relative to the screen surface is comparable to that found in present types of theatres. Fig. 5 illustrates the usual excessive viewing angle conditions within a theatre employing a projection screen according to my invention. As an example, the projector 23 may be situated one hundred feet from the screen 15 which is shown as being approximately twenty feet wide, thus forming a light beam having a divergence angle $a$ of approximately 12° at the extremities thereof. The outer conical surface of each of the various projections 16 converge at an included angle $b$ of approximately 25°. Due to the fact that this angle of convergence of the conical surfaces of each of the projections 16 is greater than the angle of divergence $a$ of the light beam from the projector 23 a projection 16' at the edge of the screen 15 will be illuminated around the entire conical surface thereof by the projector beam. The angle $a$ is small enough to permit the projector 23 to be situated above the center of the screen 15 at a suitable elevation, such as is the usual practice in modern picture theaters, while illuminating the under portions of the various projections 16.

Due to the fact that the complete surface of each projection 16 and 16', as well as a fillet 28 formed at the base of each projection 16 (Figs. 2 and 3), is illuminated by the beams of light from the projector 23, observers situated at extreme angles from the screen 15, as indicated at the points 26 and 27, may receive an abundant amount of reflected light from the screen.

I claim:
1. A picture projection screen comprising a flexible sheet having an array of frusto-conical projections integrally formed on one side thereof, said projections being hollow to permit the passage of sound waves therethrough, each of said frusto-conical projections having a frusto-conical bore substantially symmetrical about an axis at right angles to the plane of said sheet, said sheet being light reflective on the side thereof having said array of projections.

2. A sound transmitting picture projection screen of the reflective type comprising a flexible sheet of material having an array of small tubular frusto-conical projections integrally formed on one side thereof, each of said projections having a bore extending through said sheet, said sheet being adapted to be placed in close proximity to a loud speaker with the side thereof containing said projections situated away from said loud speaker, and means filling those of said tubular projections outside an area conforming substantially to the area of the mouth of said loudspeaker.

BERNARD M. BODDE.